(12) United States Patent
Li et al.

(10) Patent No.: US 9,591,125 B1
(45) Date of Patent: Mar. 7, 2017

(54) TESTING AUDIO QUALITY ASSOCIATED WITH A USER DEVICE DURING A DOUBLE TALK COMMUNICATION

(71) Applicant: Verizon Patent and Licensing Inc., Arlington, VA (US)

(72) Inventors: Yuk Lun Li, Morganville, NJ (US); Prakash Khanduri, Freehold, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/051,176

(22) Filed: Feb. 23, 2016

(51) Int. Cl.
*H04M 1/24* (2006.01)
*H04M 3/08* (2006.01)
*H04M 3/22* (2006.01)

(52) U.S. Cl.
CPC ................ *H04M 3/2236* (2013.01)

(58) Field of Classification Search
CPC ........... H04M 2201/40; H04M 3/2236; H04M 3/323; G10L 21/02; G10L 21/0208; G10L 25/69; G04Q 3/00
USPC .... 379/1.01, 21, 22.02, 27.01, 27.02, 27.03, 379/29.01, 31, 32.01, 32.04, 12, 29.02
See application file for complete search history.

(56) References Cited

U.S. PATENT DOCUMENTS

| | | | |
|---|---|---|---|
| 5,715,198 A * | 2/1998 | Braceras | G11C 11/419 365/154 |
| 5,737,389 A * | 4/1998 | Allen | H04M 3/40 379/1.01 |
| 5,794,188 A * | 8/1998 | Hollier | H04M 1/24 704/228 |
| 5,799,133 A * | 8/1998 | Hollier | G10L 19/018 704/200.1 |
| 5,867,813 A * | 2/1999 | Di Pietro | G10L 25/69 704/202 |
| 5,999,900 A * | 12/1999 | Hollier | G10L 25/69 370/249 |
| 6,011,830 A * | 1/2000 | Sasin | H04M 3/323 379/10.03 |
| 6,035,270 A * | 3/2000 | Hollier | G10L 19/018 704/202 |
| 6,389,111 B1* | 5/2002 | Hollier | H04M 3/2236 379/1.01 |
| 9,299,359 B2* | 3/2016 | Taleb | G10L 21/02 |

(Continued)

OTHER PUBLICATIONS

International Telecommunications Union, "ITU-T P.340: Series P: Telephone Transmission Quality, Telephone Installations, Local Line Networks: Transmission characteristics and speech quality parameters of hands-free terminals," https://www.itu.int/rec/T-REC-P.340-200005-I/en, May 2000, 48 pages.

*Primary Examiner* — Binh Tieu (57) ABSTRACT

A device may provide a baseline uplink audio signal and a baseline downlink audio signal to create a double talk communication for a user device. The device may receive an audio signal, transmitted by the user device, based on providing the baseline uplink audio signal and the baseline downlink audio signal. The device may determine a score based on the audio signal. The score may indicate an effectiveness of the user device with regard to processing audio associated with the double talk communication. The device may provide information that identifies the score to indicate the effectiveness of the user device with regard to processing audio associated with the double talk communication.

20 Claims, 9 Drawing Sheets

(56) References Cited

U.S. PATENT DOCUMENTS

2011/0141925 A1* 6/2011 Velenko .............. H04L 65/1069
370/252
2013/0304461 A1* 11/2013 Taleb ...................... G10L 21/02
704/226

* cited by examiner

TESTING AUDIO QUALITY ASSOCIATED WITH A USER DEVICE DURING A DOUBLE TALK COMMUNICATION

BACKGROUND

A double talk communication may refer to a phone call or other voice communication where two parties, at different ends of a connection, are speaking concurrently, or where a party on one end of a connection is speaking while there is noise at the other end of the connection. For example, a first user device may receive and output an audio signal (e.g., via a speaker), received from a second user device, while concurrently capturing another audio signal (e.g., via a microphone), such as a user's voice or other noise in an environment of the first user device.

DETAILED DESCRIPTION OF PREFERRED EMBODIMENTS

The following detailed description of example implementations refers to the accompanying drawings. The same reference numbers in different drawings may identify the same or similar elements.

A user device may process audio signals associated with a double talk communication. A double talk communication may refer to a communication (e.g., a voice call or a video call) where two parties, at different ends of a connection, are speaking concurrently. Additionally, or alternatively, a double talk communication may refer to a communication where a party on one end of a connection is speaking while there is noise at the other end of the connection. As an example, a first user device may receive and output a downlink audio signal (e.g., via a speaker), received from a second user device, while concurrently capturing and processing an uplink audio signal (e.g., via a microphone), such as a user's voice. In this case, the first user device may process the uplink audio signal by cancelling or suppressing the downlink audio signal when the downlink audio signal is output and captured via a microphone of the first user device. This may prevent a user of the second user device from hearing the user's own voice (e.g., an echo) output by the second user device.

Different user devices and audio processing techniques may be capable of cancelling or suppressing noise or echoes to varying degrees of effectiveness. Implementations described herein provide techniques for testing audio quality associated with a user device during a double talk communication. These techniques may be used to evaluate the effectiveness of echo cancellation, noise suppression, or the like. In this way, audio processing by the user device may be improved to increase the audio quality of communications associated with the user device, particularly during double talk communications.

Figure 1A:
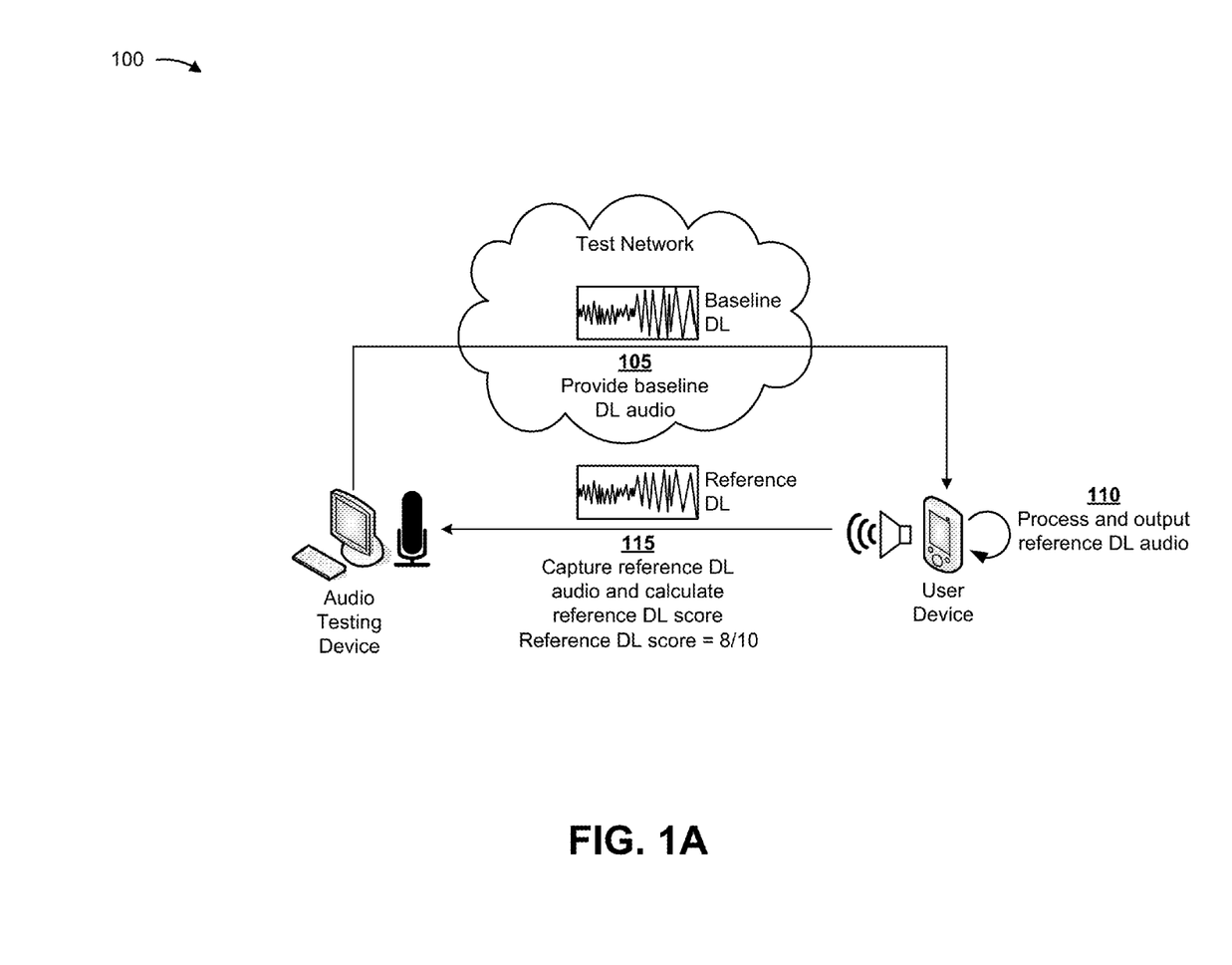
FIGS. 1A-1F are diagrams of an overview of an example implementation described herein.

FIGS. 1A-1F are diagrams of an overview of an example implementation 100 described herein. As shown in FIG. 1A, and by reference number 105, an audio testing device may transmit a baseline downlink audio signal via a test network, and a user device may receive the baseline downlink audio signal via the test network. The baseline downlink audio signal may be used as a baseline to determine audio quality of a downlink audio signal output by the user device. For example, the user device may process the baseline downlink audio signal to generate a reference downlink audio signal, as shown by reference number 110. The user device may output the reference downlink audio signal via an output component, such as a speaker or a wired connection with the audio testing device.

As shown by reference number 115, the audio testing device may capture the reference downlink audio signal via an input component, such as a microphone or a wired connection with the user device. The audio testing device may calculate a reference downlink score for the reference downlink audio signal. For example, the reference downlink score may be based on a comparison between the reference downlink audio signal, output by the user device, and the baseline downlink audio signal transmitted to the user device.

In FIG. 1A, the reference downlink score is shown as a numeric score of 8 out of 10 because the audio quality of the downlink audio signal has been reduced by processing of the signal by the user device. The reference downlink score may represent an audio quality of a downlink audio signal when the user device is not involved with a double talk communication, and may be used as a reference for comparison with a downlink double talk score that represents an audio quality of a downlink audio signal when the user device is involved with a double talk communication, as described in more detail below.

Figure 1B:
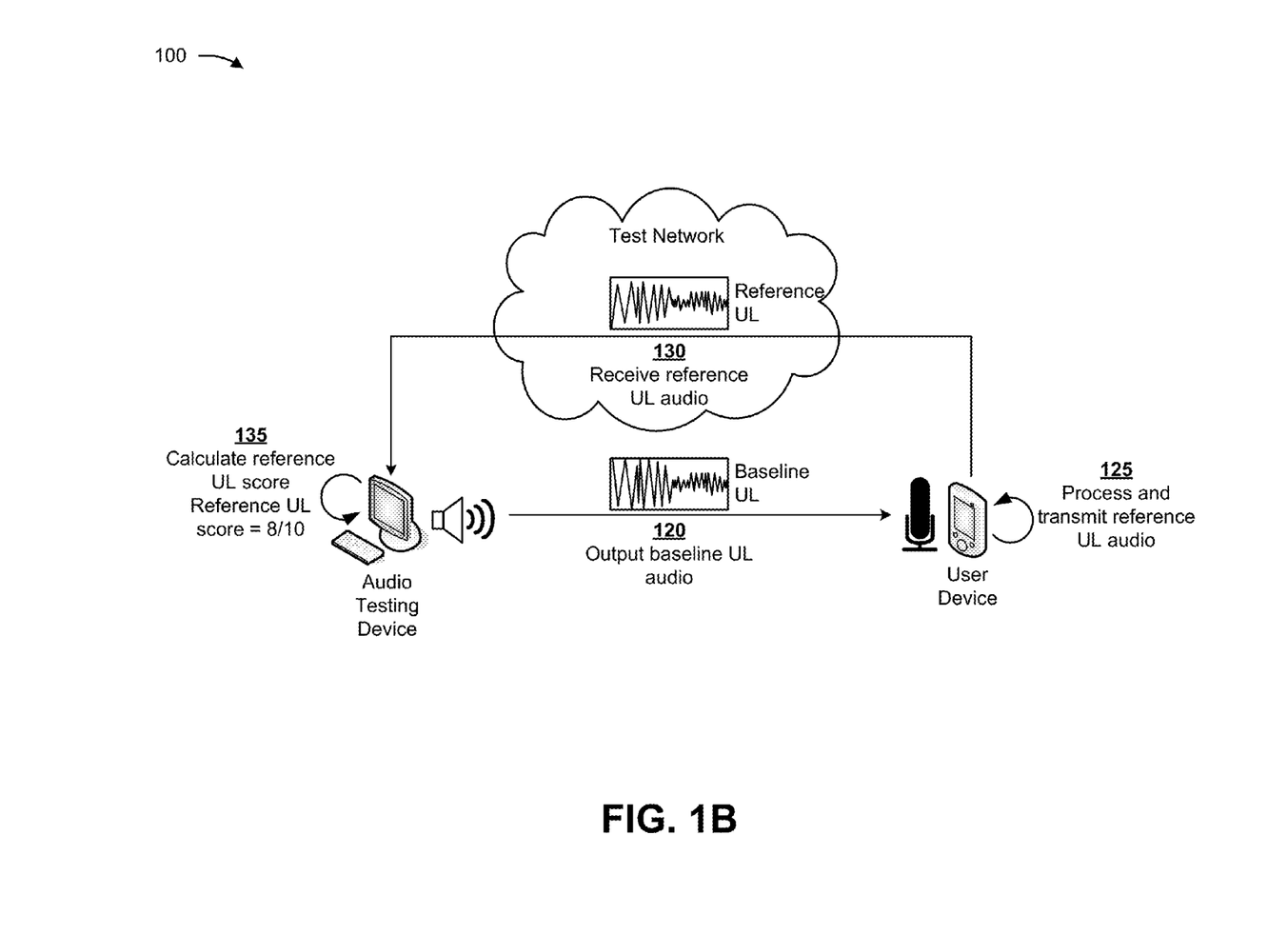

As shown in FIG. 1B, and by reference number 120, the audio testing device may output a baseline uplink audio signal via an output component, such as a speaker or a wired connection with the user device. The user device may capture the baseline uplink audio signal via an input component, such as a speaker or a wired connection with the audio testing device. The baseline uplink audio signal may be used as a baseline to determine audio quality of an uplink audio signal transmitted by the user device. For example, the user device may process the baseline uplink audio signal to generate a reference uplink audio signal, as shown by reference number 125. The user device may transmit the reference uplink audio signal to the audio testing device via the test network.

As shown by reference number 130, the audio testing device may receive the reference uplink audio signal via the test network. As shown by reference number 135, the audio testing device may calculate a reference uplink score for the reference uplink audio signal. For example, the reference uplink score may be based on a comparison between the reference uplink audio signal, transmitted by the user device, and the baseline uplink audio signal output by the audio testing device.

In FIG. 1B, the reference uplink score is shown as a numeric score of 8 out of 10 because the audio quality of the uplink audio signal has been reduced by transmission of the signal over the air from the audio testing device to the user device and/or processing of the signal by the user device. The reference uplink score may represent an audio quality of an uplink audio signal when the user device is not involved with a double talk communication, and may be used as a reference for comparison with an uplink double talk score that represents an audio quality of an uplink audio signal when the user device is involved with a double talk communication, as described in more detail below.

Figure 1C:
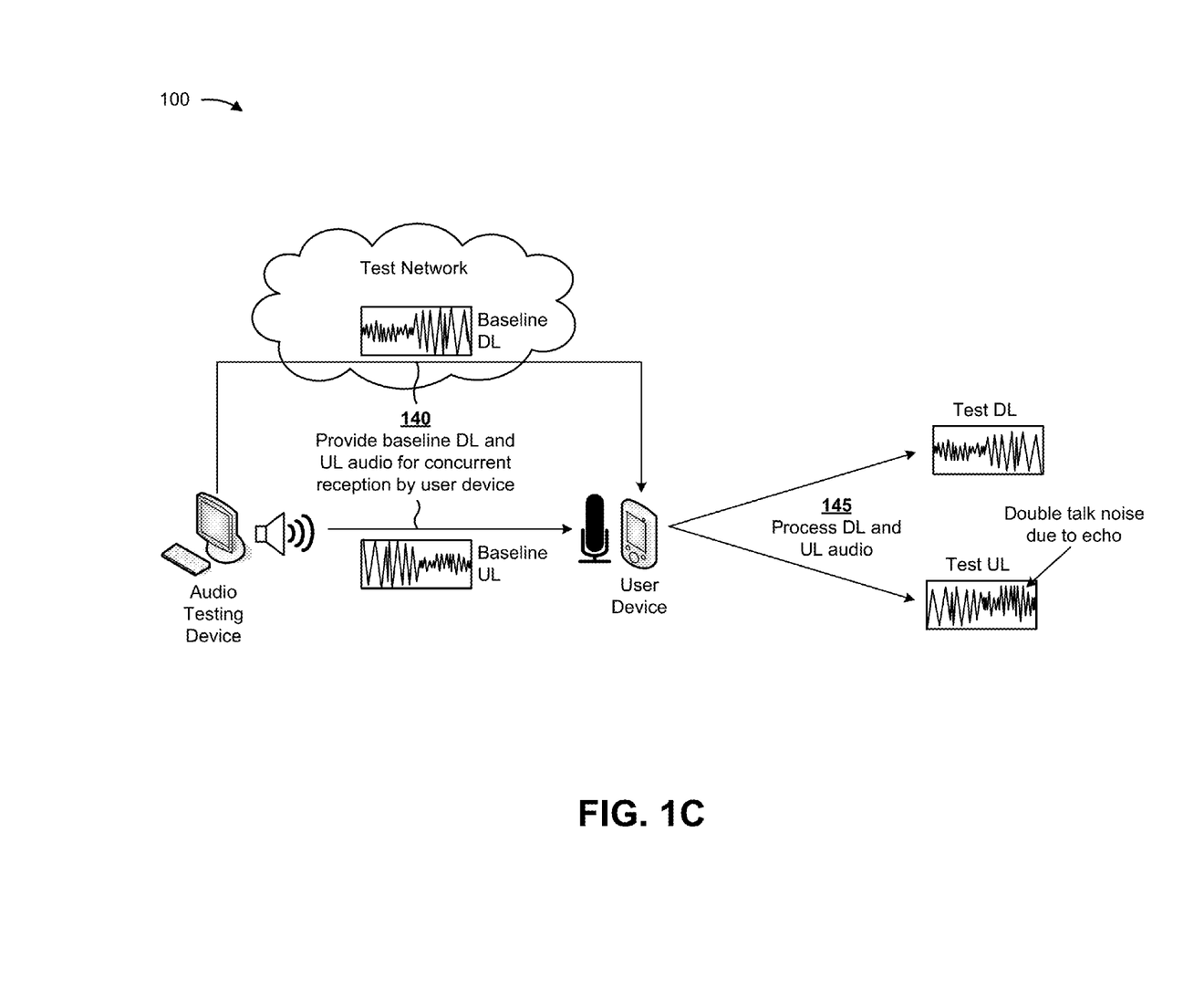

As shown in FIG. 1C, and by reference number 140, the audio testing device may provide the baseline downlink audio signal and the baseline uplink audio signal for concurrent reception by the user device in order to test the user device during a double talk communication. For example, the audio testing device may transmit the baseline downlink audio signal via the test network, and may output the baseline uplink audio signal via an output component, as described above in connection with FIGS. 1A and 1B. The audio testing device may synchronize timing of the transmissions so that the user device outputs the signals concurrently, thereby causing a double talk communication. For example, the user device may receive the baseline downlink audio signal via the test network, and may output the baseline downlink audio signal via an output component while concurrently capturing the baseline uplink audio signal via an input component.

As shown by reference number 145, the user device may process the baseline downlink audio signal and the baseline uplink audio signal to generate a test downlink audio signal and a test uplink audio signal. These test signals may be used to generate audio quality scores for the user device in a double talk communication scenario, as described below.

Figure 1D:
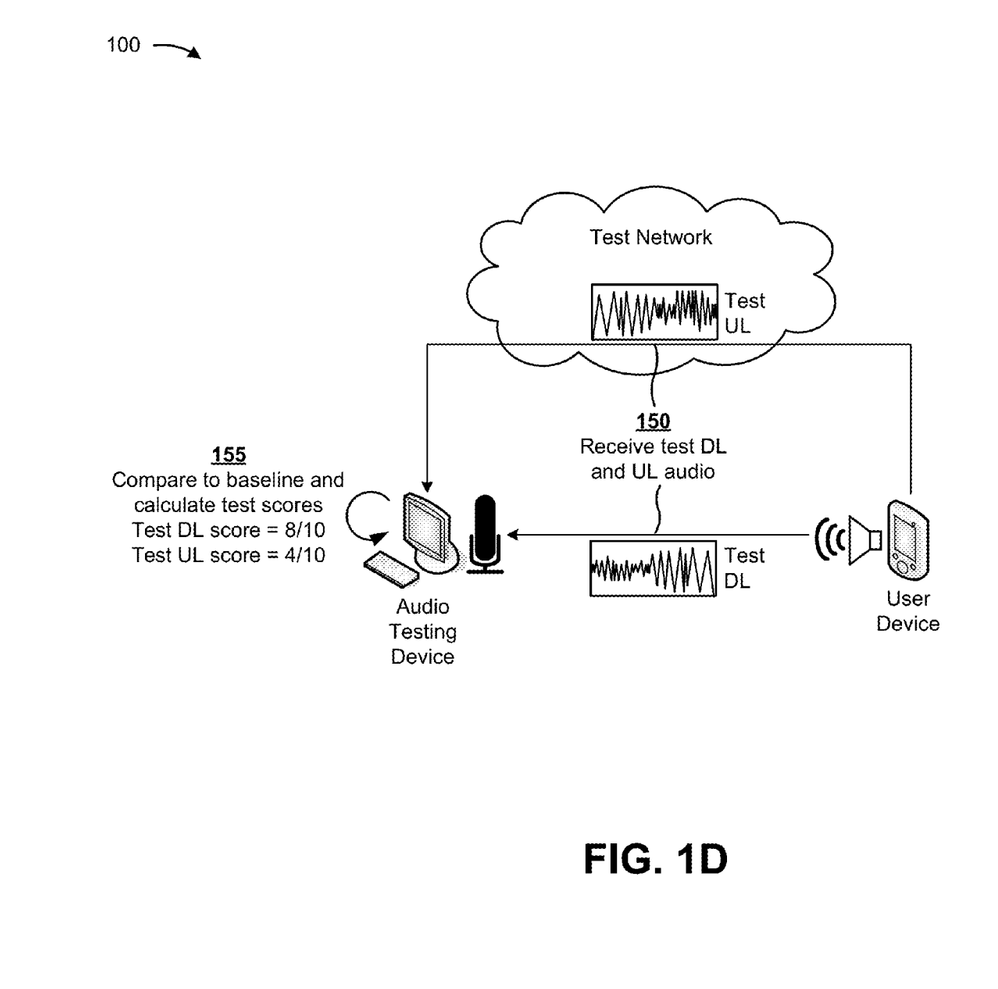

As shown in FIG. 1D, and by reference number 150, the audio testing device may receive the test downlink audio signal and the test uplink audio signal from the user device. For example, the user device may transmit the test uplink audio signal to the audio testing device via the test network, and may output the test downlink audio signal via an output component for reception via an input component of the audio testing device. As shown by reference number 155, the audio testing device may calculate a test downlink score for the test downlink audio signal, and may calculate a test uplink score for the test uplink audio signal. For example, these test scores may be based on a comparison between the respective test signals, output by the user device, and the respective baseline signals transmitted to the user device.

In FIG. 1D, the test downlink score is shown as a numeric score of 8 out of 10 because the audio quality of the downlink audio signal has been reduced by transmission and/or processing of the signal. The test uplink score is shown as a numeric score of 4 out of 10 for similar reasons. The respective test scores may represent an audio quality of respective downlink and uplink audio signals when the user device is involved with a double talk communication. In some implementations, the audio testing device may compare a test score, determined when the user device is in a double talk scenario, to a reference score determined when the user device is not in a double talk scenario. In this way, an effectiveness of the user device regarding processing double talk communications can be determined and compared to a control scenario where the user device is not in a double talk communication scenario.

Figure 1E:
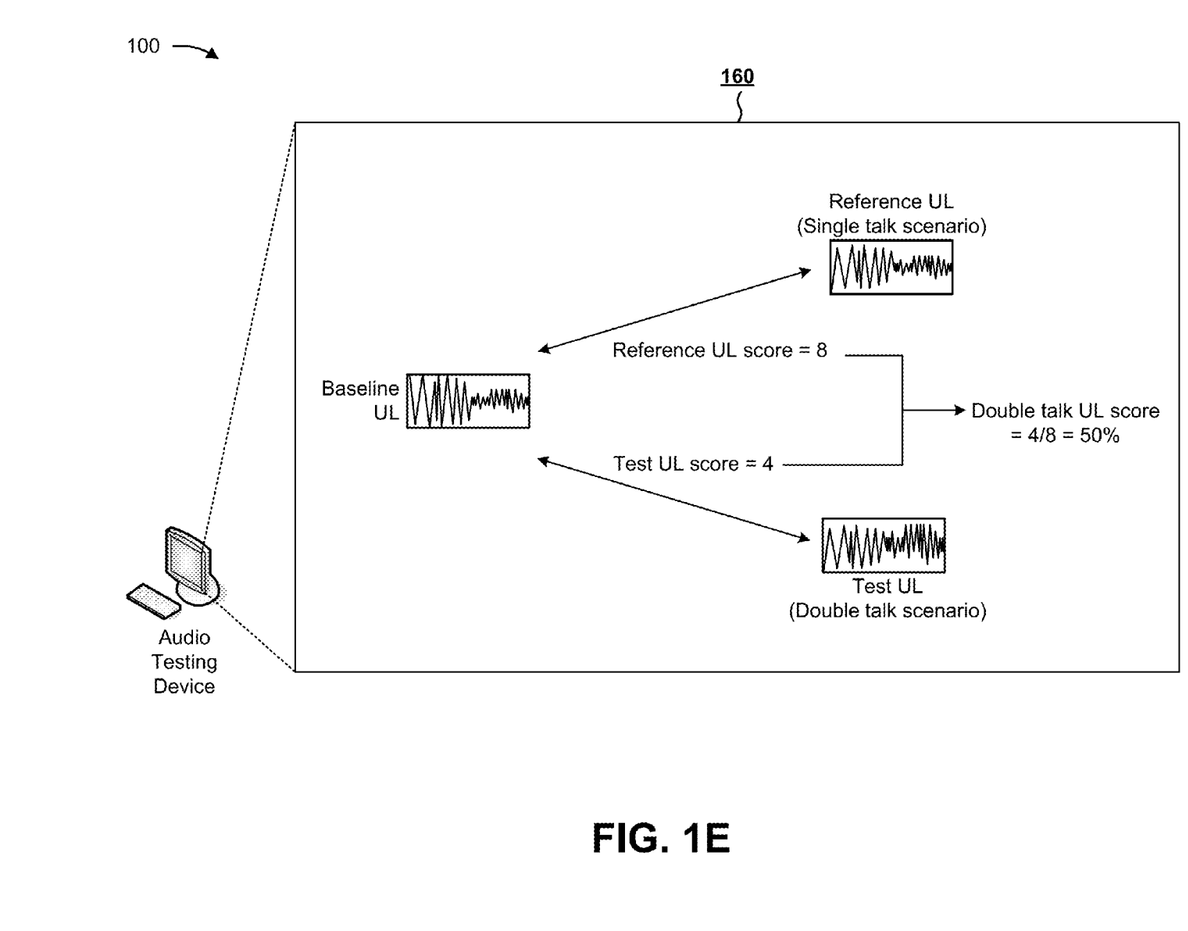

As shown in FIG. 1E, the audio testing device may determine an effectiveness of the user device regarding processing uplink audio during double talk communications. For example, as shown by reference number 160, the audio testing device may determine a reference uplink score of 8 (as described in connection with FIG. 1B), may determine a test uplink score of 4 (as described in connection with FIG. 1D), and may determine a double talk uplink score of 50% based on the reference uplink score and the test uplink score (e.g., 4/8=50%). This score may indicate that the audio quality of an uplink signal output by the user device during a double talk communication is half as good as the audio quality of an uplink signal output by the user device during a single talk communication (e.g., a communication without double talk).

Figure 1F:
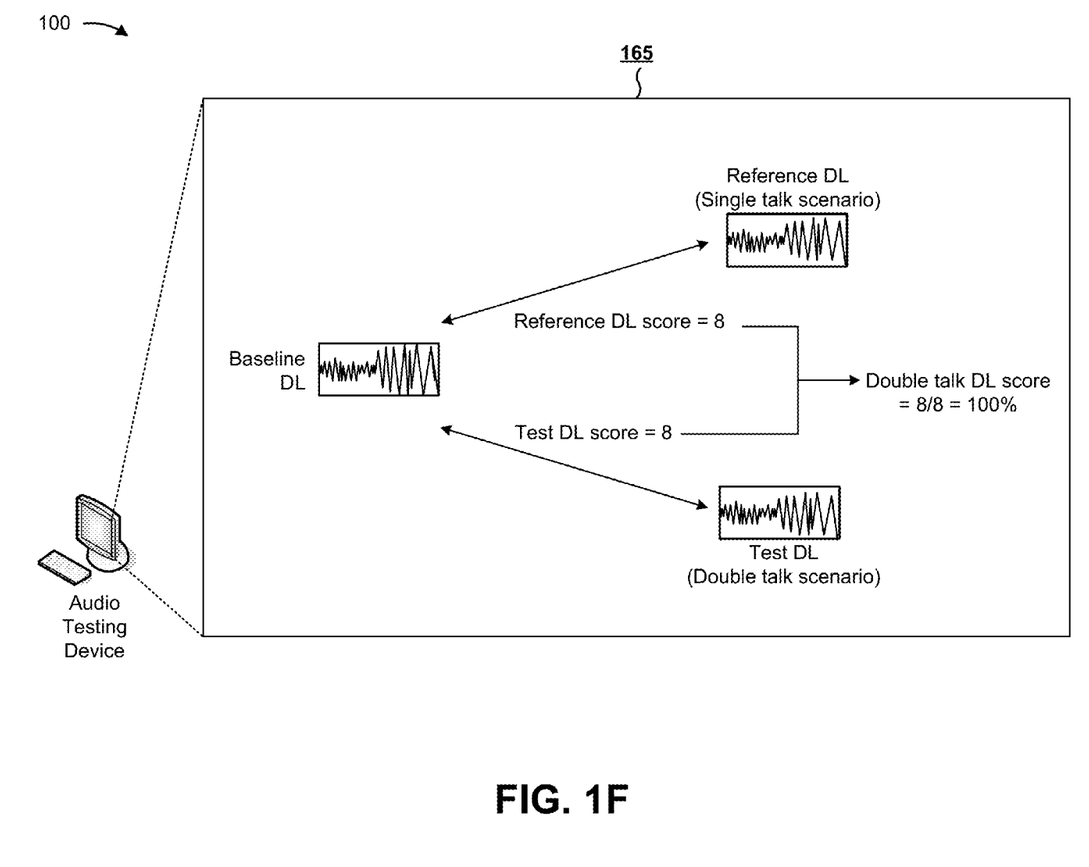

As shown in FIG. 1F, the audio testing device may determine an effectiveness of the user device regarding processing downlink audio during double talk communications. For example, as shown by reference number 165, the audio testing device may determine a reference downlink score of 8 (as described in connection with FIG. 1A), may determine a test downlink score of 8 (as described in connection with FIG. 1D), and may determine a double talk downlink score of 100% based on the reference downlink score and the test downlink score (e.g., 8/8=100%). This score may indicate that the audio quality of a downlink signal output by the user device during a double talk communication is equally as good as the audio quality of a downlink signal output by the user device during a single talk communication.

The audio testing device may provide, for display, information that identifies the double talk uplink score and/or the double talk downlink score. This information may be used to compare the effectiveness of different user devices regarding double talk communications, to compare the effectiveness of different audio processing techniques regarding double talk communications, to improve user devices and/or audio processing techniques associated with processing double talk communications, or the like. In some implementations, the audio testing device may perform automated testing of a variety of user devices and/or audio processing techniques, and may provide an indication of which user devices and/or techniques are most effective at processing double talk communications. Additionally, or alternatively, the audio testing device may be used to configure a user device to use an audio processing technique that is more effective (as compared to other audio processing techniques) at processing double talk communications. In this way, the quality of audio communications may be improved.

As indicated above, FIGS. 1A-1F are provided merely as an example. Other examples are possible and may differ from what was described with regard to FIGS. 1A-1F.

Figure 2:
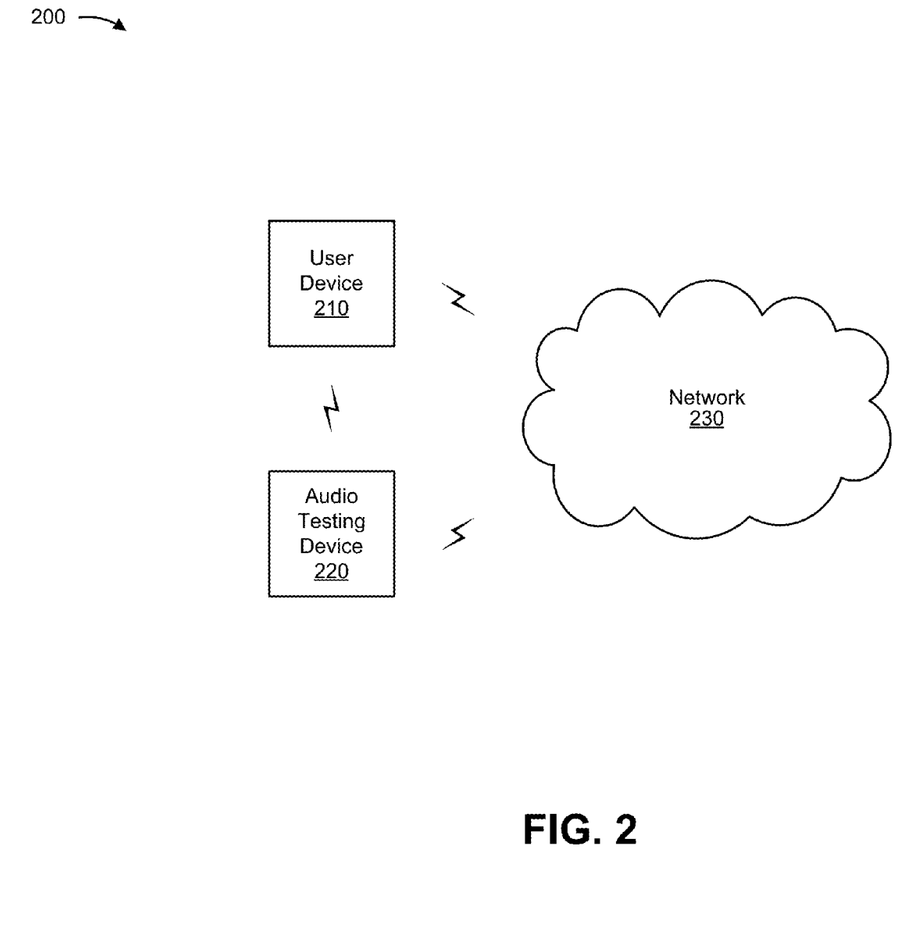
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an audio testing device 220, and a network 230. Devices of environment 200 may interconnect via wired connections, wireless connections, or a combination of wired and wireless connections.

User device 210 includes one or more devices capable of transmitting, receiving, and processing audio communications, such as voice communications, video communications, or the like. For example, user device 210 may include a communication device, such as a phone (e.g., a wireline phone, a wireless phone, a mobile phone, a smart phone, etc.), a desktop computer, a laptop computer, a tablet computer, a wearable communication device (e.g., a smart wristwatch and/or a pair of smart eyeglasses), a handheld transceiver (e.g., a walkie-talkie), or a similar type of device.

Audio testing device 220 includes one or more devices capable of transmitting, receiving, and processing audio communications, and/or capable of testing audio signals received from user device 210. For example, audio testing device 220 may include a communication device, such as a phone, a desktop computer, a laptop computer, a tablet computer, a server device, or a similar type of device. In some implementations, audio testing device 220 and user device 210 may communicate via network 230. Additionally, or alternatively, audio testing device 220 and user device 210 may communicate via a sound transmission medium, such as via airwaves, via a direct wired connection (e.g., a phone connector, such as a headphone jack, a 2.5 millimeter (mm) connector, or a 3.5 mm connector), or the like.

Network 230 may include one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some implementations, network 230 may include a simulated network and/or a test network that simulates one or more of the above types of networks, such that audio testing device 220 can test user device 210 without interfering with a deployed network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
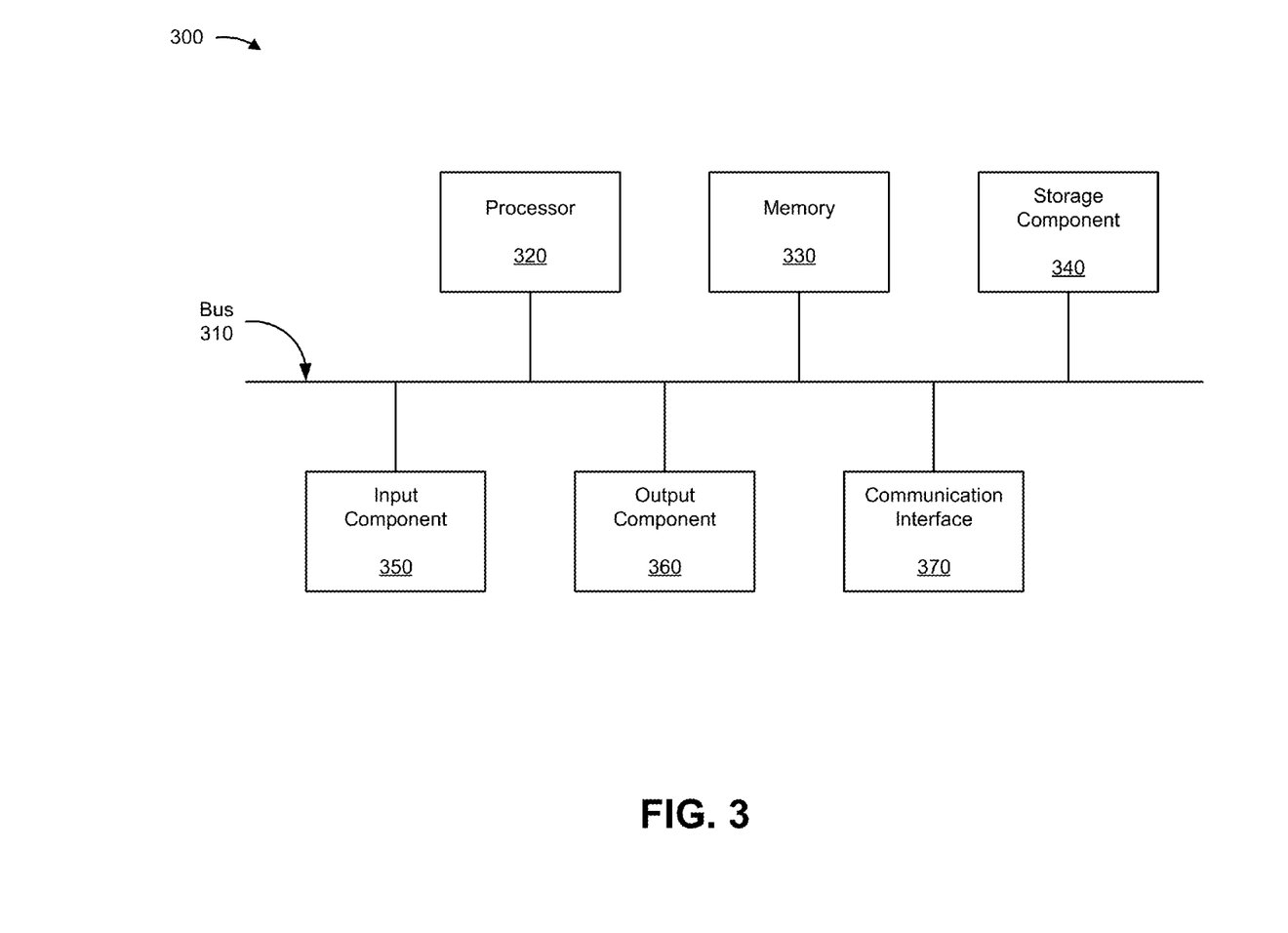
FIG. 3 is a diagram of example components of one or more devices of FIG. 2.

FIG. 3 is a diagram of example components of a device 300. Device 300 may correspond to user device 210 and/or audio testing device 220. In some implementations, user device 210 and/or audio testing device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, a microphone, and/or a phone connector). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, one or more light-emitting diodes (LEDs), and/or a phone connector).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
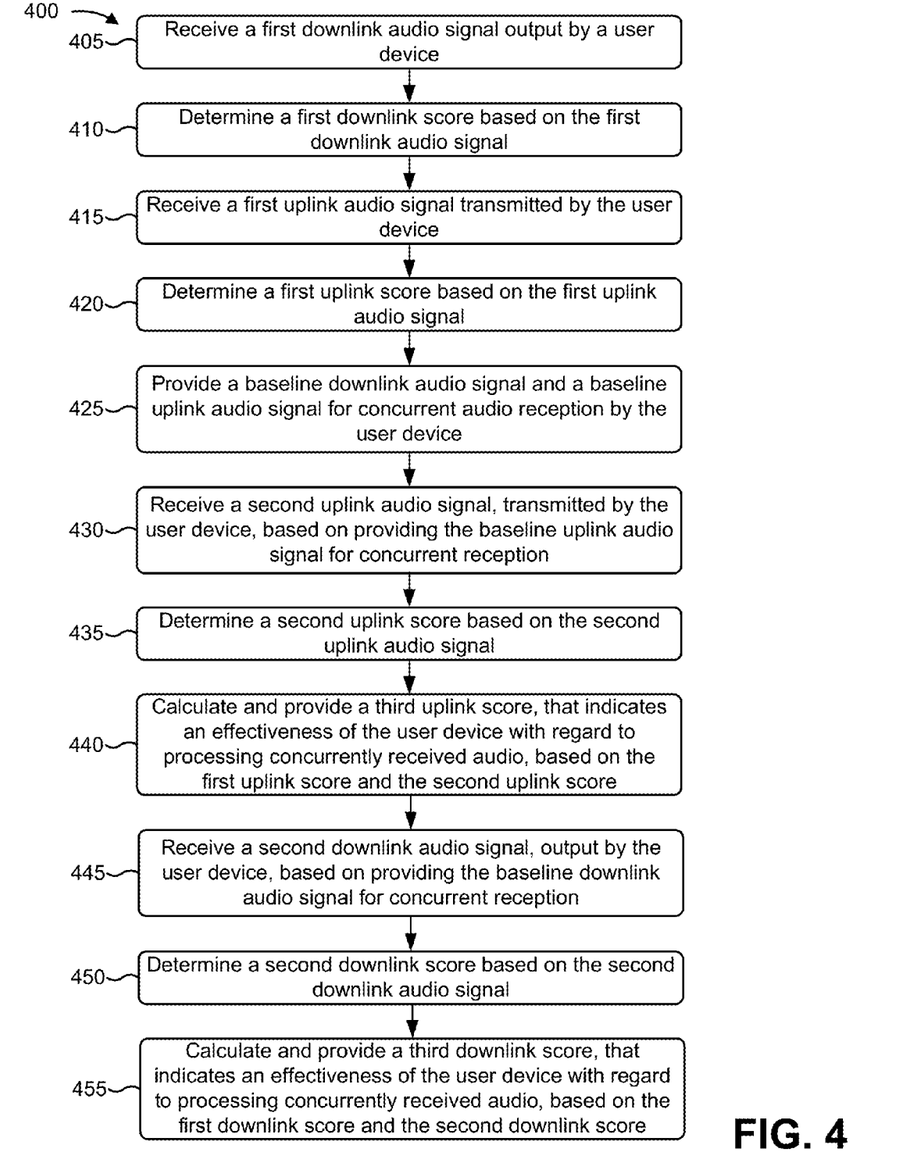
FIG. 4 is a flow chart of an example process for testing audio quality associated with a user device during a double talk communication.

FIG. 4 is a flow chart of an example process 400 for testing audio quality associated with a user device during a double talk communication. In some implementations, one or more process blocks of FIG. 4 may be performed by audio testing device 220. In some implementations, one or more process blocks of FIG. 4 may be performed by another device or a group of devices separate from or including audio testing device 220, such as user device 210.

As shown in FIG. 4, process 400 may include receiving a first downlink audio signal output by a user device (block 405). For example, audio testing device 220 may capture a first downlink audio signal, which may be output by user device 210 (e.g., as audio output) via an output component of user device 210, such as a speaker or a phone connector. Audio testing device 220 may capture the first downlink audio signal via an input component of audio testing device 220, such as a microphone or a phone connector. Additionally, or alternatively, user device 210 may record the first downlink audio signal, and may provide the recording to audio testing device 220 via network 230 (e.g., in an audio file).

In some implementations, audio testing device 220 may transmit a baseline downlink audio signal to user device 210 via network 230. The baseline downlink audio signal may be used as a baseline, for comparison, to determine the audio quality of one or more downlink audio signals output by user device 210. User device 210 may receive the baseline downlink audio signal via network 230, may process the baseline downlink audio signal to generate the first downlink audio signal (e.g., by applying one or more audio processing techniques, by applying noise suppression, by applying echo cancelling, by decoding the baseline downlink audio signal and/or encoding the first downlink audio signal, or the like), and may output the first downlink audio signal via an output component of user device 210. Audio testing device 220 may capture this first downlink audio signal output by user device 210.

Transmission of the baseline downlink audio signal and subsequent capturing of the first downlink audio signal by audio testing device 220 may simulate an audio communication, such as a voice communication, from audio testing device 220 to user device 210. For example, the baseline downlink audio signal may include voice audio. Additionally, or alternatively, the baseline downlink audio signal may include background noise and/or other audio. For example, the baseline downlink audio signal may include an audio clip of a person talking. In some implementations, the first downlink audio signal may be referred to as a reference downlink audio signal, and may act as a reference for downlink audio quality when user device 210 is in a single talk communication scenario.

As further shown in FIG. 4, process 400 may include determining a first downlink score based on the first downlink audio signal (block 410). For example, audio testing device 220 may calculate a first downlink score that represents a measure of audio quality of the first downlink audio signal. In some implementations, audio testing device 220 may apply an automated audio quality scoring technique, such as an automated mean opinion scoring (MOS) technique, to the first downlink audio signal to determine the first downlink score. Additionally, or alternatively, the first downlink score may be based on the baseline downlink audio signal. For example, the first downlink score may indicate a degree of difference (or similarity) between the first downlink audio signal and the baseline downlink audio signal. The first downlink score may be represented by a value, such as a numeric value (e.g., a number or a percentage), a string value (e.g., "high," "medium," "low," "match," or "does not match"), or the like.

The first downlink score may be referred to as a reference downlink score because the first downlink score may act as a reference for comparing another score. For example, the first downlink score may represent a first audio quality of a first downlink audio signal captured when user device 210 is in a single talk communication scenario, and may be used as a reference for comparison with a second downlink score that represents a second audio quality of a second downlink audio signal captured when user device 210 is in a double talk communication scenario, as described in more detail below.

As further shown in FIG. 4, process 400 may include receiving a first uplink audio signal transmitted by the user device (block 415). For example, audio testing device 220 may receive a first uplink audio signal, which may be transmitted by user device 210. In some implementations, audio testing device 220 may output a baseline uplink audio signal (e.g., as audio output) via an output component of audio testing device 220, such as a speaker or a phone connector. The baseline uplink audio signal may be used as a baseline, for comparison, to determine the audio quality of one or more uplink audio signals output by user device 210. User device 210 may capture the baseline uplink audio signal via an input component of user device 210 (e.g., a microphone or phone connector), may process the baseline uplink audio signal to generate the first uplink audio signal (e.g., by applying one or more audio processing techniques, by applying noise suppression, by applying echo cancelling, by decoding the baseline uplink audio signal and/or encoding the first uplink audio signal, or the like), and may transmit the first uplink audio signal to audio testing device 220 via network 230.

Output of the baseline uplink audio signal and subsequent reception of the first uplink audio signal by audio testing device 220 may simulate an audio communication, such as a voice communication, from user device 210 to audio testing device 220. For example, like the baseline downlink audio signal, the baseline uplink audio signal may include voice audio (e.g., an audio clip of a person talking), background noise, and/or other audio. In some implementations, the first uplink audio signal may be referred to as a reference uplink audio signal, and may act as a reference for uplink audio quality when user device 210 is in a single talk communication scenario.

As further shown in FIG. 4, process 400 may include determining a first uplink score based on the first uplink audio signal (block 420). For example, audio testing device 220 may calculate a first uplink score that represents a measure of audio quality of the first uplink audio signal. Audio testing device 220 may determine the first uplink score in a similar manner to determining the first downlink score, as described above. For example, audio testing device 220 may determine the first uplink score by applying an automated audio quality scoring technique (e.g., a MOS technique), by determining a degree of difference (or similarity) between the first uplink audio signal and the baseline uplink audio signal, or the like. The first uplink score may be represented by a value, as described above in connection with the first downlink score.

The first uplink score may be referred to as a reference uplink score because the first uplink score may act as a reference for comparing another score. For example, the first uplink score may represent a first audio quality of a first uplink audio signal received when user device 210 is in a single talk communication scenario, and may be used as a reference for comparison with a second uplink score that represents a second audio quality of a second uplink audio signal received when user device 210 is in a double talk communication scenario, as described in more detail below.

As further shown in FIG. 4, process 400 may include providing a baseline downlink audio signal and a baseline uplink audio signal for concurrent audio reception by the user device (block 425). For example, audio testing device 220 may provide the baseline downlink audio signal and the baseline uplink audio signal to user device 210 such that both signals are received concurrently by user device 210, thereby creating a double talk communication scenario. In other words, audio testing device 220 may time the transmission of the baseline downlink audio signal (via network 230) and the output of the baseline uplink audio signal (via an output component of audio testing device 220) such that user device 210 outputs a downlink audio signal (via an output component of user device 210) while concurrently capturing an uplink audio signal (via an input component of user device 210).

In some implementations, audio testing device 220 may determine a first time to transmit the baseline downlink audio signal and/or a second time to output the baseline uplink audio signal to cause concurrent reception by user device 210. For example, audio testing device 220 may determine the first time and the second time based on a latency associated with a downlink audio signal (e.g., a network latency associated with network 230), a latency associated with an uplink audio signal (e.g., a latency of a transmission medium), a processing time associated with processing downlink audio signals and/or uplink audio signals by user device 210, or the like. In this way, audio testing device 220 may create a double talk communication scenario for user device 210.

As further shown in FIG. 4, process 400 may include receiving a second uplink audio signal, transmitted by the user device, based on providing the baseline uplink audio signal for concurrent reception (block 430), and determining a second uplink score based on the second uplink audio signal (block 435). For example, audio testing device 220 may receive a second uplink audio signal and may determine a second uplink score associated with the second uplink audio signal. Audio testing device 220 may receive the second uplink audio signal in a similar manner as the first uplink audio signal (e.g., as described above in connection with block 415), and may determine the second uplink score in a similar manner as the first uplink score (e.g., as described above in connection with block 420).

In some implementations, the second uplink audio signal may be referred to as a test uplink audio signal, and may be used to test uplink audio quality when user device 210 is in a double talk communication scenario. Additionally, or alternatively, the second uplink score may be referred to as a test uplink score because the second uplink score may be determined based on testing user device 210 during a double talk communication scenario.

In some implementations, the second uplink audio signal may be different from the first uplink audio signal because user device 210 generates the second uplink audio signal while concurrently processing the baseline uplink audio signal and the baseline downlink audio signal. For example, the second uplink audio signal may include audio from the baseline downlink audio signal, such as when user device 210 fails to perform full echo cancellation and/or noise suppression when processing the baseline downlink audio signal and the baseline uplink audio signal concurrently. As another example, audio from the baseline uplink audio signal may be removed due to inaccurate echo cancellation and/or noise suppression.

As further shown in FIG. 4, process 400 may include calculating and providing a third uplink score, that indicates an effectiveness of the user device with regard to processing concurrently received audio, based on the first uplink score and the second uplink score (block 440). For example, audio testing device 220 may determine a third uplink score that indicates a relative effectiveness of user device 210 with regard to performing audio processing of uplink audio signals during a double talk communication scenario. In some implementations, audio testing device 220 may determine the third uplink score based on the first uplink score and/or the second uplink score. For example, the first uplink score may represent a first audio quality of a first uplink audio signal processed by user device 210 in a single talk communication scenario, and the second uplink score may represent a second audio quality of a second uplink audio signal processed by user device 210 in a double talk communication scenario. The third uplink score may represent, for example, a relationship between the first audio quality and the second audio quality.

In some implementations, audio testing device 220 may determine the third uplink score based on comparing the first uplink score and the second uplink score. Additionally, or alternatively, audio testing device 220 may determine the third uplink score by performing a mathematical operation that includes the first uplink score and/or the second uplink score. For example, audio testing device 220 may determine the third uplink score by determining a difference between the first uplink score and the second uplink score (e.g., the first uplink score minus the second uplink score or the second uplink score minus the first uplink score), by determining a ratio between the first uplink score and the second uplink score (e.g., the first uplink score divided by the second uplink score or the second uplink score divided by the first uplink score), or the like.

In some implementations, the third uplink score may be referred to as an uplink double talk score because the third uplink score may represent an effectiveness of user device 210 regarding processing uplink audio signals during a double talk communication scenario. For example, the third uplink score may represent an effectiveness of an echo cancellation technique performed by user device 210, a noise suppression technique performed by user device 210, or the like.

In some implementations, audio testing device 220 may provide an indication of the third uplink score. For example, audio testing device 220 may provide the indication of the third uplink score for display, for storage, to another device (e.g., for display or storage), or the like. In some implementations, the indication may be used (e.g., by a user, by audio testing device 220, or by another device) to compare different user devices 210 and/or audio processing techniques regarding an effectiveness of processing double talk communications.

Additionally, or alternatively, the indication may be used to configure user device 210 with a particular audio processing technique that results in improved double talk communication performance. For example, audio testing device 220 may instruct user device 210 to configure one or more parameters associated with an audio processing technique, and may test multiple audio processing techniques configured using different sets of parameters. Audio testing device 220 may identify a set of parameters associated with a higher score (e.g., a higher uplink double talk score) as compared to other sets of parameters, and may provide instructions to configure user device 210 using the identified set of parameters, thereby improving performance of user device 210.

As further shown in FIG. 4, process 400 may include receiving a second downlink audio signal, output by the user device, based on providing the baseline downlink audio signal for concurrent reception (block 445), and determining a second downlink score based on the second downlink audio signal (block 450). For example, audio testing device 220 may capture a second downlink audio signal and may determine a second downlink score associated with the second downlink audio signal. Audio testing device 220 may capture the second downlink audio signal in a similar manner as the first downlink audio signal (e.g., as described above in connection with block 405), and may determine the second downlink score in a similar manner as the first downlink score (e.g., as described above in connection with block 410).

In some implementations, the second downlink audio signal may be referred to as a test downlink audio signal, and may be used to test downlink audio quality when user device 210 is in a double talk communication scenario. Additionally, or alternatively, the second downlink score may be referred to as a test downlink score because the second downlink score may be determined based on testing user device 210 during a double talk communication scenario.

In some implementations, the second downlink audio signal may be different from the first downlink audio signal because user device 210 generates the second downlink audio signal while concurrently processing the baseline uplink audio signal and the baseline downlink audio signal. For example, user device 210 may perform echo cancellation and/or noise suppression when generating the second downlink audio signal from the baseline downlink audio signal to prevent audio from the baseline downlink audio signal from being included in the second uplink audio signal.

As further shown in FIG. 4, process 400 may include calculating and providing a third downlink score, that indicates an effectiveness of the user device with regard to processing concurrently received audio, based on the first downlink score and the second downlink score (block 455). For example, audio testing device 220 may determine a third downlink score that indicates a relative effectiveness of user device 210 with regard to performing audio processing of downlink audio signals during a double talk communication scenario. Audio testing device 220 may determine the third downlink score in a similar manner as the third uplink score (e.g., as described above in connection with block 440). For example, audio testing device 220 may determine the third downlink score based on the first downlink score and/or the second downlink score (e.g., based on a relationship between the first downlink score and the second downlink score, based on comparing the first downlink score and the second downlink score, by performing a mathematical operation that includes the first downlink score and/or the second downlink score, or the like).

In some implementations, the third downlink score may be referred to as a downlink double talk score because the third downlink score may represent an effectiveness of user device 210 regarding processing downlink audio signals during a double talk communication scenario. For example, the third downlink score may represent an effectiveness of an echo cancellation technique performed by user device 210, a noise suppression technique performed by user device 210, or the like.

In some implementations, audio testing device 220 may provide an indication of the third downlink score in a similar manner as providing the third uplink score (e.g., as described above in connection with block 440). Additionally, or alternatively, the indication of the third downlink score may be used (e.g., by a user, by audio testing device 220, or by another device) in a similar manner as using the third uplink score (e.g., as described above in connection with block 440). For example, audio testing device 220 may use the third downlink score to compare different user devices 210 and/or audio processing techniques regarding an effectiveness of processing double talk communications, to configure user device 210 with a particular audio processing technique that results in improved double talk communication performance, or the like.

In this way, audio testing device 220 may test audio quality associated with user device 210 during a double talk communication, and may improve audio processing of user device 210 to increase the audio quality of communications associated with user device 210, particularly during double talk communications.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein provide techniques for testing audio quality associated with a user device during a double talk communication. These techniques may be used to evaluate the effectiveness of echo cancellation, noise suppression, or the like. In this way, audio processing by the user device may be improved to increase the audio quality of communications associated with the user device, particularly during double talk communications.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive a first uplink audio signal transmitted by a user device;
determine a first uplink score based on the first uplink audio signal, the first uplink score indicating a measure of quality of the first uplink audio signal;
provide a baseline uplink audio signal and a baseline downlink audio signal to create a double talk communication scenario for the user device;
receive a second uplink audio signal, transmitted by the user device, based on providing the baseline uplink audio signal and the baseline downlink audio signal;
determine a second uplink score based on the second uplink audio signal, the second uplink score indicating a measure of quality of the second uplink audio signal;
determine a third uplink score based on the first uplink score and the second uplink score, the third uplink score indicating an effectiveness of the user device with regard to processing uplink audio in association with the double talk communication scenario; and
provide an indication of the third uplink score to indicate the effectiveness of the user device with regard to processing uplink audio in association with the double talk communication scenario.

2. The device of claim 1, where the one or more processors are further to:
receive a first downlink audio signal output by the user device;
determine a first downlink score based on the first downlink audio signal,
the first downlink score indicating a measure of quality of the first downlink audio signal;
receive a second downlink audio signal, output by the user device, based on providing the baseline uplink audio signal and the baseline downlink audio signal;
determine a second downlink score based on the second downlink audio signal,
the second downlink score indicating a measure of quality of the second downlink audio signal;
determine a third downlink score based on the first downlink score and the second downlink score,
the third downlink score indicating an effectiveness of the user device with regard to processing downlink audio in association with the double talk communication scenario; and
provide an indication of the third downlink score to indicate the effectiveness of the user device with regard to processing downlink audio in association with the double talk communication scenario.

3. The device of claim 2, where the one or more processors, when determining the first downlink score, are to:
determine the first downlink score based on the first downlink audio signal and the baseline downlink audio signal; and
where the one or more processors, when determining the second downlink score, are to:
determine the second downlink score based on the second downlink audio signal and the baseline downlink audio signal.

4. The device of claim 2, where the one or more processors are further to:
transmit the baseline downlink audio signal to the user device; and
where the one or more processors, when capturing the first downlink audio signal, are to:
capture the first downlink audio signal based on transmitting the baseline downlink audio signal to the user device.

5. The device of claim 1, where the one or more processors, when determining the first uplink score, are to:
determine the first uplink score based on the first uplink audio signal and the baseline uplink audio signal; and
where the one or more processors, when determining the second uplink score, are to:
determine the second uplink score based on the second uplink audio signal and the baseline uplink audio signal.

6. The device of claim 1, where the one or more processors are further to:
output the baseline uplink audio signal for reception by the user device; and
where the one or more processors, when receiving the first uplink audio signal, are to:
receive the first uplink audio signal based on outputting the baseline uplink audio signal for reception by the user device.

7. The device of claim 1, where the one or more processors, when providing the baseline uplink audio signal and the baseline downlink audio signal to create the double talk communication scenario, are to:
output the baseline uplink audio signal via an output component of the device for audio reception by the user device; and
transmit the baseline downlink audio signal to the user device via a network,
the baseline uplink audio signal and the baseline downlink audio signal being provided for concurrent reception by the user device.

8. A non-transitory computer-readable medium storing instructions, the instructions comprising:
one or more instructions that, when executed by one or more processors, cause the one or more processors to:
receive a first downlink audio signal output by a user device;
determine a first downlink score based on the first downlink audio signal, the first downlink score indicating a measure of quality of the first downlink audio signal;
provide a baseline uplink audio signal and a baseline downlink audio signal to create a double talk communication scenario at the user device;
receive a second downlink audio signal, output by the user device, based on providing the baseline uplink audio signal and the baseline downlink audio signal;

determine a second downlink score based on the second downlink audio signal, the second downlink score indicating a measure of quality of the second downlink audio signal;

determine a third downlink score based on the first downlink score and the second downlink score, the third downlink score indicating an effectiveness of the user device with regard to processing downlink audio in association with the double talk communication scenario; and provide an indication of the third downlink score to indicate the effectiveness of the user device with regard to processing downlink audio in association with the double talk communication scenario.

9. The non-transitory computer-readable medium of claim 8, where the one or more instructions, when executed by the one or more processors, further cause the one or more processors to:

receive a first uplink audio signal transmitted by the user device;

determine a first uplink score based on the first uplink audio signal,
the first uplink score indicating a measure of quality of the first uplink audio signal;

receive a second uplink audio signal, transmitted by the user device, based on providing the baseline uplink audio signal and the baseline downlink audio signal;

determine a second uplink score based on the second uplink audio signal,
the second uplink score indicating a measure of quality of the second uplink audio signal;

determine a third uplink score based on the first uplink score and the second uplink score,
the third uplink score indicating an effectiveness of the user device with regard to processing uplink audio in association with the double talk communication scenario; and provide an indication of the third uplink score to indicate the effectiveness of the user device with regard to processing uplink audio in association with the double talk communication scenario.

10. The non-transitory computer-readable medium of claim 9, where the one or more instructions, that cause the one or more processors to determine the first uplink score, cause the one or more processors to:

determine the first uplink score based on the first uplink audio signal and the baseline uplink audio signal; and where the one or more instructions, that cause the one or more processors to determine the second uplink score, cause the one or more processors to:
determine the second uplink score based on the second uplink audio signal and the baseline uplink audio signal.

11. The non-transitory computer-readable medium of claim 9, where the one or more instructions, when executed by the one or more processors, cause the one or more processors to:

output the baseline uplink audio signal for reception by the user device; and where the one or more instructions, that cause the one or more processors to receive the first uplink audio signal, cause the one or more processors to:
receive the first uplink audio signal based on outputting the baseline uplink audio signal for reception by the user device.

12. The non-transitory computer-readable medium of claim 8, where the one or more instructions, that cause the one or more processors to determine the first downlink score, cause the one or more processors to:

determine the first downlink score based on the first downlink audio signal and the baseline downlink audio signal; and where the one or more instructions, that cause the one or more processors to determine the second downlink score, cause the one or more processors to:
determine the second downlink score based on the second downlink audio signal and the baseline downlink audio signal.

13. The non-transitory computer-readable medium of claim 8, where the one or more instructions, when executed by the one or more processors, cause the one or more processors to:

transmit the baseline downlink audio signal to the user device via a network; and where the one or more instructions, that cause the one or more processors to receive the first downlink audio signal, cause the one or more processors to:
capture the first downlink audio signal based on transmitting the baseline downlink audio signal to the user device.

14. The non-transitory computer-readable medium of claim 8, where the one or more instructions, that cause the one or more processors to provide the baseline uplink audio signal and the baseline downlink audio signal to create the double talk communication scenario, cause the one or more processors to:

synchronize a timing for providing the baseline uplink audio signal and the baseline downlink audio signal; and provide the baseline uplink audio signal and the baseline downlink audio signal based on synchronizing the timing.

15. A method, comprising:

receiving, by a device, a first uplink audio signal transmitted by a user device;

determining, by the device, a first uplink score based on the first uplink audio signal, the first uplink score indicating a measure of quality of the first uplink audio signal;

providing, by the device, a baseline uplink audio signal and a baseline downlink audio signal to create a double talk communication for the user device;

receiving, by the device, a second uplink audio signal, transmitted by the user device, based on providing the baseline uplink audio signal and the baseline downlink audio signal;

determining, by the device, a second uplink score based on the second uplink audio signal, the second uplink score indicating a measure of quality of the second uplink audio signal;

determining, by the device, a third uplink score based on the first uplink score and the second uplink score, the third uplink score indicating an effectiveness of the user device with regard to processing uplink audio in association with the double talk communication; and providing, by the device, an indication of the third uplink score to indicate the effectiveness of the user device with regard to processing uplink audio in association with the double talk communication.

16. The method of claim 15, where providing the baseline uplink audio signal comprises:

outputting the baseline uplink audio signal as audio output via an output component of the device.

17. The method of claim 15, where providing the baseline downlink audio signal comprises:
   transmitting the baseline downlink audio signal via a network.

18. The method of claim 15, where the baseline uplink audio signal and the baseline downlink audio signal include voice audio.

19. The method of claim 15, where determining the third uplink score comprises:
   determining the third uplink score based on determining a ratio between the first uplink score and the second uplink score.

20. The method of claim 15, where determining the third uplink score comprises:
   determining the third uplink score based on determining a difference between the first uplink score and the second uplink score.

\* \* \* \* \*